United States Patent
Han

(10) Patent No.: US 11,147,105 B2
(45) Date of Patent: Oct. 12, 2021

(54) METHOD FOR REASSIGNING ROOT SEQUENCE INDEX AND APPARATUS THEREFOR

(71) Applicant: Samsung Electronics Co., Ltd, Suwon-si (KR)

(72) Inventor: Kiyoung Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/487,808

(22) PCT Filed: Feb. 20, 2018

(86) PCT No.: PCT/KR2018/002080
§ 371 (c)(1),
(2) Date: Aug. 21, 2019

(87) PCT Pub. No.: WO2018/155885
PCT Pub. Date: Aug. 30, 2018

(65) Prior Publication Data
US 2020/0037370 A1    Jan. 30, 2020

(30) Foreign Application Priority Data
Feb. 21, 2017    (KR) .......................... 10-2017-0022961

(51) Int. Cl.
*H04W 74/08*    (2009.01)
*H04W 72/04*    (2009.01)
(Continued)

(52) U.S. Cl.
CPC ....... *H04W 74/0841* (2013.01); *H04W 24/04* (2013.01); *H04W 72/042* (2013.01); *H04W 74/002* (2013.01); *H04W 88/18* (2013.01)

(58) Field of Classification Search
None
See application file for complete search history.

(56) References Cited

U.S. PATENT DOCUMENTS

| 8,095,143 B2 | 1/2012 | Amirijoo et al. |
| 8,526,996 B2 | 9/2013 | Amirijoo et al. |
| (Continued) | | |

FOREIGN PATENT DOCUMENTS

| KR | 10-2015-0027548 A | 3/2015 |
| KR | 10-2015-0039978 A | 4/2015 |
| (Continued) | | |

OTHER PUBLICATIONS

European Patent Office, "Supplementary European Search Report," Application No. EP18758085.7, dated Dec. 19, 2019, 7 pages.
(Continued)

*Primary Examiner* — Scott M Sciacca

(57) ABSTRACT

A method for determining a root sequence index by a network management server, according to an embodiment of the disclosure, comprises the steps of: determining whether to reassign a root sequence index of a cell managed by a base station; when reassigning the root sequence index of the cell, determining the root sequence index to be reassigned to the cell on the basis of the number of handovers between the cell and adjacent cells of the cell; and transmitting the determined root sequence index to the base station.

15 Claims, 7 Drawing Sheets

(51) Int. Cl.
*H04W 24/04* (2009.01)
*H04W 74/00* (2009.01)
*H04W 88/18* (2009.01)

(56) References Cited

U.S. PATENT DOCUMENTS

| | | |
|---|---|---|
| 2010/0210243 A1 | 8/2010 | Vujcic |
| 2010/0232318 A1* | 9/2010 | Sarkar .................. H04W 24/02 370/254 |
| 2010/0284350 A1 | 11/2010 | Korhonen et al. |
| 2011/0158104 A1* | 6/2011 | Frenger ............. H04W 74/0833 370/241 |
| 2012/0294185 A1* | 11/2012 | Queseth ............. H04W 74/008 370/252 |
| 2014/0348121 A1 | 11/2014 | Su et al. |
| 2017/0295596 A1* | 10/2017 | Chen ..................... H04L 5/0053 |

FOREIGN PATENT DOCUMENTS

| | | |
|---|---|---|
| KR | 20150039978 A * | 4/2015 |
| KR | 10-2016-0123096 A | 10/2016 |
| WO | 2010/093306 A1 | 8/2010 |

OTHER PUBLICATIONS

International Search Report dated May 28, 2018 in connection with International Patent Application No. PCT/KR2018/002080, 2 pages.
Written Opinion of the International Searching Authority dated May 28, 2018 in connection with International Patent Application No. PCT/KR2018/002080, 5 pages.

* cited by examiner

METHOD FOR REASSIGNING ROOT SEQUENCE INDEX AND APPARATUS THEREFOR

CROSS-REFERENCE TO RELATED APPLICATIONS

This application is a 371 of International Application No. PCT/KR2018/002080 filed on Feb. 20, 2018, which claims priority to Korean Patent Application No. 10-2017-0022961 filed on Feb. 21, 2017, the disclosures of which are herein incorporated by reference in their entirety.

BACKGROUND

1. Field

The disclosure relates to a method for reassigning root sequence indexes and a network management server acting as an apparatus for reassigning root sequence indexes.

2. Description of Related Art

Since the commercial deployment of 4G communication systems, efforts have been made to develop improved 5G or pre-5G communication systems to meet the ever increasing demand for wireless data traffic. As such, 5G or pre-5G communication systems are also called "beyond 4G network" or "post LTE system".

As the three main use cases of the 5G communication system, the telecommunications industry including the International Telecommunication Union (ITU) and the 3rd Generation Partnership Project (3GPP) has proposed enhanced Mobile Broadband (eMBB), ultra-reliable and low latency communications, and massive machine type communications (mMTC).

5G communication systems consider utilization of the mmWave band (e.g., 60 GHz band). To decrease path loss and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems.

For 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like.

In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

Meanwhile, the 5G communication system specifies a random access procedure for the terminal to communicate with the base station through the network.

The random access channel (RACH) can be used by a terminal for random access to a base station in a state where the terminal has not achieved uplink synchronization with the base station. The RACH can be used both for initial ranging in which the terminal initially accesses the base station in a state where the terminal is downlink synchronized with the base station, and for periodic ranging in which the terminal accesses the base station as needed in a state where the terminal is connected to the base station.

For initial ranging, if a signal from the base station is detected through the synchronization channel (SCH), the terminal can perform downlink synchronization in response to the SCH signal.

When downlink synchronization is achieved, the terminal may obtain information on the radio frame number (RFN), subframe boundary, and cell ID, and may obtain system information through the broadcast channel.

Then, the terminal can perform uplink synchronization through the RACH by using the RACH configuration information included in the system information, thereby completing the connection process to the system.

For random access to the base station, the terminal can generate a RACH preamble sequence using a root sequence index assigned to the cell in which the terminal is located.

Here, if the terminal is located in a boundary area between cells or if the number of neighbor cells exceeds the number of root sequence indexes, a collision may occur between root sequences assigned to the individual cells.

Accordingly, a scheme is required to reassign the root sequence indexes for the cells with a possibility of a root sequence collision.

Aspects, features or objects of the disclosure are not limited to those described above. Other aspects, advantages, and salient features of the disclosure will become apparent to those skilled in the art from the following description.

SUMMARY

According to an embodiment of the disclosure, there is provided a method for a network management server to determine a root sequence index. The method may include: determining whether to reassign a root sequence index of a cell managed by a base station; determining, upon determining to reassign a root sequence index, a root sequence index to be reassigned to the cell based on the number of handovers between the cell and neighbor cells thereof; and transmitting the determined root sequence index to the base station.

According to an embodiment of the disclosure, there is provided a network management server capable of determining a root sequence index. The network management server may include: a controller configured to determine whether to reassign a root sequence index of a cell managed by a base station, and determine, upon determining to reassign a root sequence index, a root sequence index to be reassigned to the cell based on handovers between the cell and neighbor cells thereof; and a communication circuit configured to transmit the determined root sequence index to the base station.

According to an embodiment of the disclosure, there is provided a storage medium storing a program that causes a network management server to: determine whether to reassign a root sequence index of a cell managed by a base station; determine, upon determining to reassign a root sequence index, a root sequence index to be reassigned to the cell based on the number of handovers between the cell and neighbor cells thereof; and transmit the determined root sequence index to the base station.

According to an embodiment of the disclosure, rapid and preliminary assignment of the root sequence index may be possible in a situation where a root sequence index collision is unavoidable.

Consequently, the probability of a false alarm due to the random access of the terminal becomes low, and the delay in random access can be minimized.

Other features or effects obtained or predicted from the embodiments of the disclosure will be explicitly or implicitly described in the detailed description of the embodiments of the disclosure. For example, various effects predictable from the embodiments of the disclosure will be described in the following detailed description.

DETAILED DESCRIPTION

Figure 1:
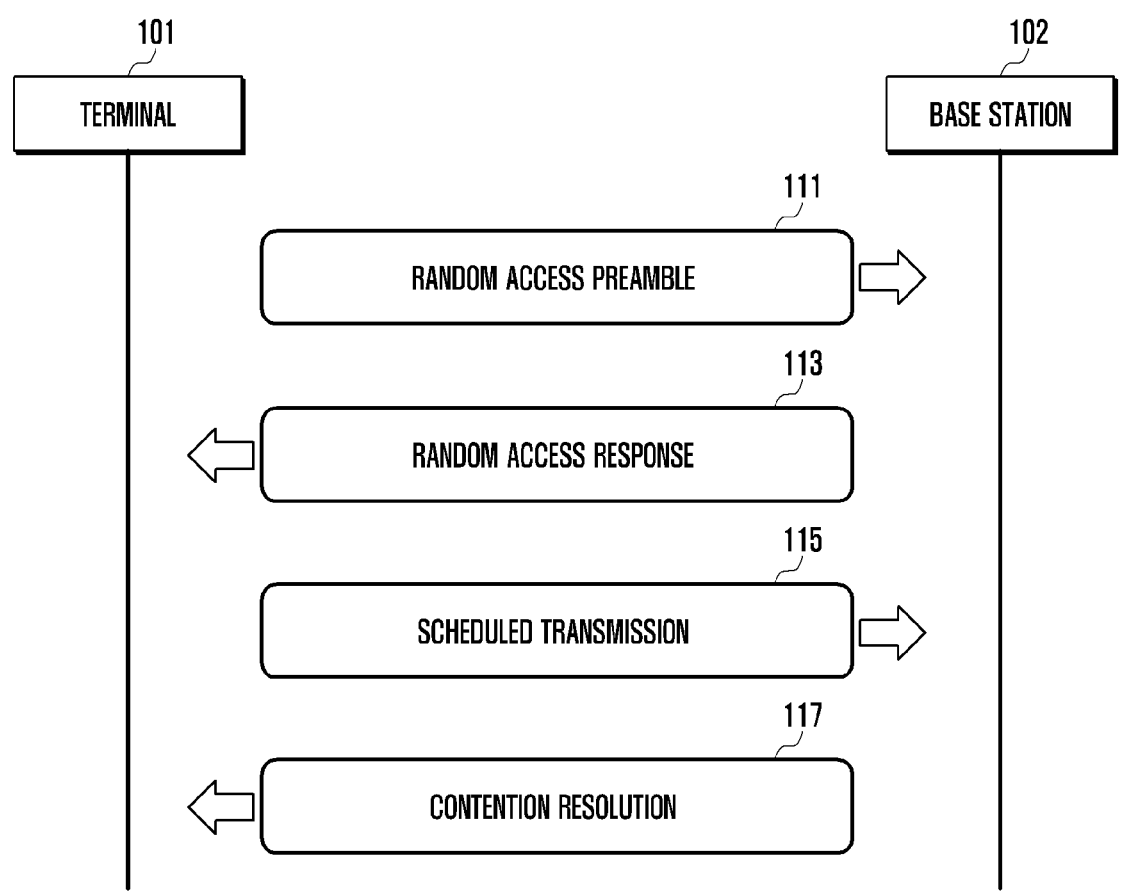
FIG. 1 illustrates a random access procedure between the base station and the terminal according to an embodiment of the disclosure.

Hereinafter, embodiments of the disclosure are described in detail with reference to the accompanying drawings. The same or similar reference symbols are used throughout the drawings to refer to the same or like parts. Descriptions of functions and structures well known in the art may be omitted for clarity and conciseness without obscuring the subject matter of the disclosure. The terms described below are defined in consideration of their functions in the disclosure, and these may vary depending on the intention of the user, the operator, or the custom. Hence, their meanings should be determined based on the overall contents of this specification.

In the description, the singular forms "a", "an" and "the" are intended to include the plural forms as well, unless the context clearly indicates otherwise.

The terms "first" and "second" may refer to various elements regardless of importance and/or order and are used to distinguish one element from another element without limitation. For example, a first component may be denoted as a second component, and vice versa without departing from the scope of the disclosure. The term "and/or" used in the context of the "X and/or Y" should be interpreted as "X", or "Y", or "X and Y".

Some terms used herein may be provided merely to describe a specific embodiment without limiting the scope of another embodiment. As used herein, the singular forms are intended to include the plural forms as well, unless the context clearly indicates otherwise. It will be understood that the terms "comprising", "including", "having" and variants thereof, when used in this specification, specify the presence of stated features, figures, steps, operations, elements, components, or combinations thereof, but do not preclude the presence or addition of one or more other features, figures, steps, operations, elements, components, or combinations thereof.

In the description, the words or phrase "associated with", "associated therewith" and variants thereof may mean the following expressions "include", "be included within", "interconnect with", "contain", "be contained within", "connect to or with", "couple to or with", "be communicable with", "cooperate with", "interleave", "juxtapose", "be proximate to", "be bound to or with", "have", and "have a property of".

It will be understood that when an element (e.g., first element) is referred to as being (operatively or communicatively) "coupled with/to" or "connected with/to" another element (e.g., second element), it can be coupled or connected with/to the other element directly or via a third element.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Prior to the detailed description, some terms or definitions necessary to understand the disclosure are described. However, these terms should be construed in a non-limiting way.

The "base station" is an entity that communicates with a terminal, and may be referred to as BS, NodeB (NB), eNodeB (eNB), or access point (AP).

The "user equipment (or, communication terminal)" is an entity communicating with a base station or another terminal, and may be referred to as node, UE, mobile station (MS), mobile equipment (ME), device, or terminal.

FIG. 1 illustrates a random access procedure between the base station and the terminal according to an embodiment of the disclosure.

With reference to FIG. 1, at step 111, the terminal 101 can obtain information on the radio frame number (RFN) and the subframe position through a synchronized downlink channel. The terminal 101 can identify the position of a channel through which the RACH preamble signal is to be transmitted based on the obtained information. Then, the terminal 101 may transmit the RACH preamble signal generated according to one of RACH preamble formats to the base station 102 through the identified channel. The RACH preamble signal may include a cyclic prefix (CP) interval being a guard sample for protection, a RACH preamble sequence interval, and a guard time (GT) interval for preventing interference with the next subframe.

Here, the RACH preamble signal transmitted by the terminal 101 to the base station 102 may be referred to as "RA message 1".

Next, at step 113, the base station 102 may transmit a random access response (RAR) signal to the terminal 101 in response to the received RACH preamble signal. Here, the RAR signal may include timing advance information including a timing advance value for uplink synchronization of the terminal 101, and uplink resource allocation information or temporary terminal ID information (T-RNTI) for message transmission.

Here, the RAR signal of step 113 transmitted by the base station 102 to the terminal 101 in response to RA message 1 at step 111 may be referred to as "RA message 2".

Next, at step 115, the terminal 101 can correct the transmission timing of the data to be transmitted through the uplink channel based on the timing advance value included in the RAR signal so as to achieve synchronization for the call connection with the base station 102. Then, the terminal 101 may transmit the base station 102 a scheduled transmission message notifying the terminal through the uplink channel.

Here, the scheduled transmission message of step 115 transmitted by the terminal 101 to the base station 102 in response to RA message 2 at step 113 may be referred to as "RA message 3".

Next, at step 117, to avoid a collision between terminals, the base station 102 may transmit a contention resolution message including shared or random UE ID information to notify those terminals having transmitted a RACH preamble signal.

Upon receiving the contention resolution message, the terminal 101 may check whether the shared UE ID or random UE ID information included in the contention resolution message is the same as the value included in the scheduled transmission message transmitted by itself at step 115. The terminal 101 may continue the subsequent procedure if they are the same, and may resume the random access procedure if otherwise.

Meanwhile, the Zadoff-Chu (ZC) sequence may be used to derive the RACH preamble sequence that constitutes the RACH preamble signal for the random access of the terminal 101.

Here, the sequence used to derive the RACH preamble sequence, such as the ZC sequence, may be referred to as a root sequence.

The RACH preamble sequences derived from the root sequence can be identified by a root sequence index (RSI) being a value of u. Each RACH preamble sequence can be derived by cyclic shifting of the root sequence according to the u value.

The $u^{th}$ root sequence of length Nzc in the frequency domain can be defined as Equation 1 below.

$$x_u(n) = e^{-j\frac{\pi un(n+1)}{N_{ZC}}}, 0 \leq n \leq N_{ZC} - 1 \quad \text{Equation 1}$$

For example, if $N_{zc}$ is 71, there may be 70 root sequence indexes.

In this case, the base station 102 may assign different root sequence indexes to the individual cells managed by the base station 102. For example, the base station 102 may assign different root sequence indexes among the 70 root sequence indexes to the cells managed by the base station 102.

The terminal 101 may attempt random access to the base station 102 by using the root sequence index broadcast in the cell. In this case, the terminal 101 can randomly select the time and frequency domain for transmitting the RACH preamble signal to the base station 102 so as to minimize random access attempts using the same root sequence index as another terminal in the cell.

Figure 2:
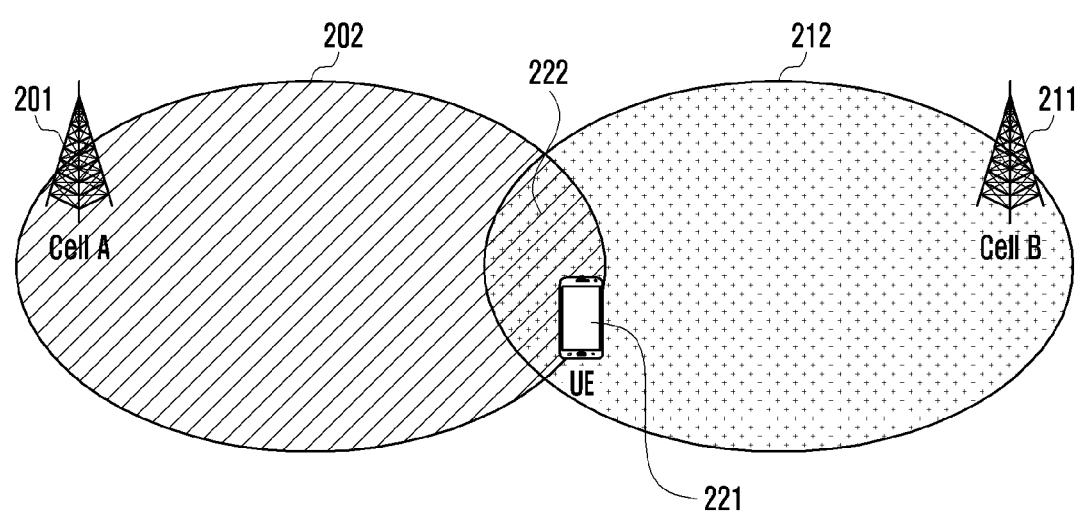
FIG. 2 depicts a situation where the terminal is located in a boundary region between cells according to an embodiment of the disclosure.

In one embodiment, as shown in FIG. 2, the terminal 221 may be located in the boundary region 222 between the first cell 202 being the coverage of the first antenna 201 and the second cell 212 being the coverage of the second antenna 211. In this case, if the root sequence index assigned to the first cell 202 and the root sequence index assigned to the second cell 212 are the same, a root sequence collision may occur.

For example, the RACH preamble signal transmitted by the terminal 221 located in the boundary region 222 to the second base station (not shown) managing the second antenna 211 may also be detected by the first base station (not shown) managing the first antenna 201.

In this case, upon decoding the RACH preamble signal, the first base station (not shown) may determine that the terminal 221 attempts random access to the first base station and transmit the RAR signal to the terminal 221 through the downlink.

The first base station (not shown) may also allocate uplink resources so as to enable the terminal 221 to transmit RA message 3 in response to the RAR signal.

In such a situation, when a RACH preamble false alarm occurs, the first base station (not shown) may have unnecessarily transmitted an RAR signal and allocated uplink resources, wasting channel resources.

In addition, owing to the occurrence of the RACH preamble false alarm, the delay of the terminal that initially connects to the first base station (not shown) may increase due to the response action of the first base station having determined that the number of terminals in the coverage has increased.

Hence, a root sequence index allocation scheme is required that can prevent a root sequence collision.

For example, upon determining that all the root sequence indexes are being used, the root sequence index used in the farthest cell can be reassigned to the cell in which the terminal is located. In this case, as the overlapping region between the cell in which the terminal is located and the farthest cell is narrow, the probability of a root sequence collision may be low.

Also, in preparation for a root sequence collision, it is possible to determine whether to reassign the root sequence based on the triggering condition serving as a reassignment condition of the root sequence.

That is, in the related art, when a collision occurs between root sequences, the root sequence index is reassigned. However, in the disclosure, performance related to the RACH (e.g., RACH-related statistical information) can be monitored, and the root sequence index can be reassigned if the performance degrades.

Also, for root sequence reassignment in the disclosure, the root sequence index can be reassigned based on the RACH related performance (e.g., RACH-related statistical information) in the boundary region between cells or statistical information on handover between cells.

Figure 3:
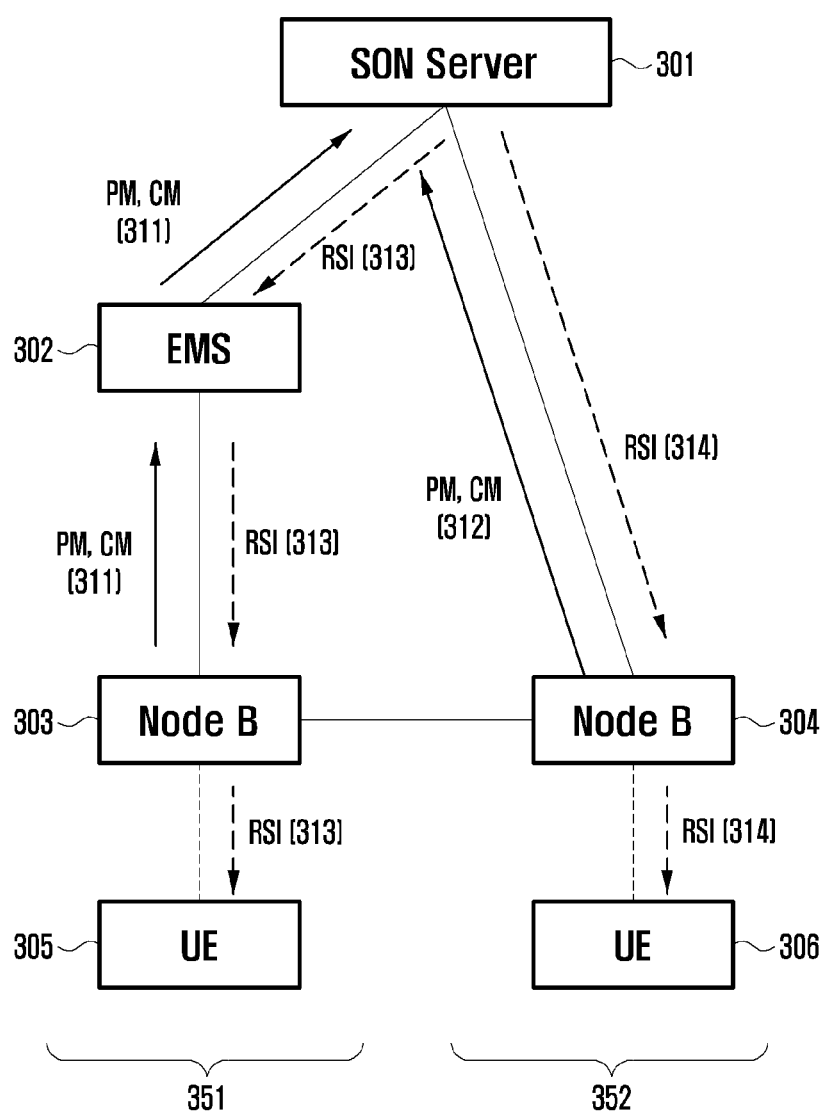
FIG. 3 illustrates a system architecture including a SON server according to an embodiment of the disclosure.

A description is given of the triggering condition for the root sequence index and a system for determining reassignment with reference to FIG. 3.

FIG. 3 illustrates a system architecture including a SON server 301.

The self-optimized network (SON) server 301 may be an example of a network management server that automatically optimizes parameters related to system resources of a cell.

That is, the SON server 301 can automatically optimize the parameters related to the system resources based on the data required for the network reported from the terminal or the base station, or statistical values calculated through the network management, without network testing of the operator personnel.

For example, when data and control signals are transmitted and received through the radio air interfaces between the base stations 303 and 304 and the terminals 305 and 306, the SON server 301 may receive statistical values related to transmission and reception of the data and control signals from the base stations 303 and 304, and determine policies suitable for the base stations 303 and 304 and parameters related to the system resources of the cell. For parameters related to a portion of the system resources, the base stations 303 and 304 may perform optimization operations without use of the SON server 301.

In FIG. 3, the SON server 301 may communicate with the base station 303 via the element management system (EMS) 302 managed by the network operator as indicated by a first path 351, or may directly communicate with the base station 304 without passing through the EMS 302 as indicated by a second path 352. In various embodiments, the SON server 301 and the EMS 302 may be implemented as a single entity.

The SON server 301 can collect RACH-related statistical information from the base stations 303 and 304.

That is, the SON server 301 may collect RACH-related statistical information to examine the triggering condition for reassignment of the root sequence index. Also, the SON server 301 may collect RACH-related statistical information necessary for reassignment of the root sequence index.

For example, at least one of performance management (PM) information or configuration management (CM) information may be included in the RACH-related statistical information.

The base stations 303 and 304 may periodically transmit the PM information and the CM information to the SON server 301. The base station 303 can transmit the PM and CM information 311 to the SON server 301 via the EMS 302 as indicated by the first path 351. Alternatively, the base station 304 may transmit the PM and CM information 312 directly to the SON server 301 as indicated by the second path 352.

The SON server 301 can determine whether to reassign the root sequence index based on the collected RACH-related statistical information.

The SON server 301 can determine whether to reassign the root sequence index on a periodic basis or at the request of the network operator.

The SON server 301 may perform reassignment of the root sequence index and send the reassigned root sequence indexes 313, 314 to the base stations 303, 304. Here, the SON server 301 may transmit the root sequence index 313 to the base station 303 via the EMS 302 as indicated by the first path 351. The SON server 301 may also transmit the root sequence index 314 directly to the base station 304 as indicated by the second path 352.

The base station 303 receiving the root sequence index 313 along the first path 351 can assign the received root sequence index 313 to the cell in which the terminal 305 is located. Specifically, the base station 303 may broadcast the root sequence index 313 to the terminal 305 located in the cell by using a system information block (SIB) broadcast message. The terminal 351 may generate an RA preamble signal using the received root sequence index 313 and transmit the RA preamble signal to the base station 303 for random access.

In the same manner, the base station 304 receiving the root sequence index 314 along the second path 352 can assign the received root sequence index 314 to the cell in which the terminal 306 is located. The terminal 306 may perform random access to the base station 304 by using the received root sequence index 314.

Figure 4:
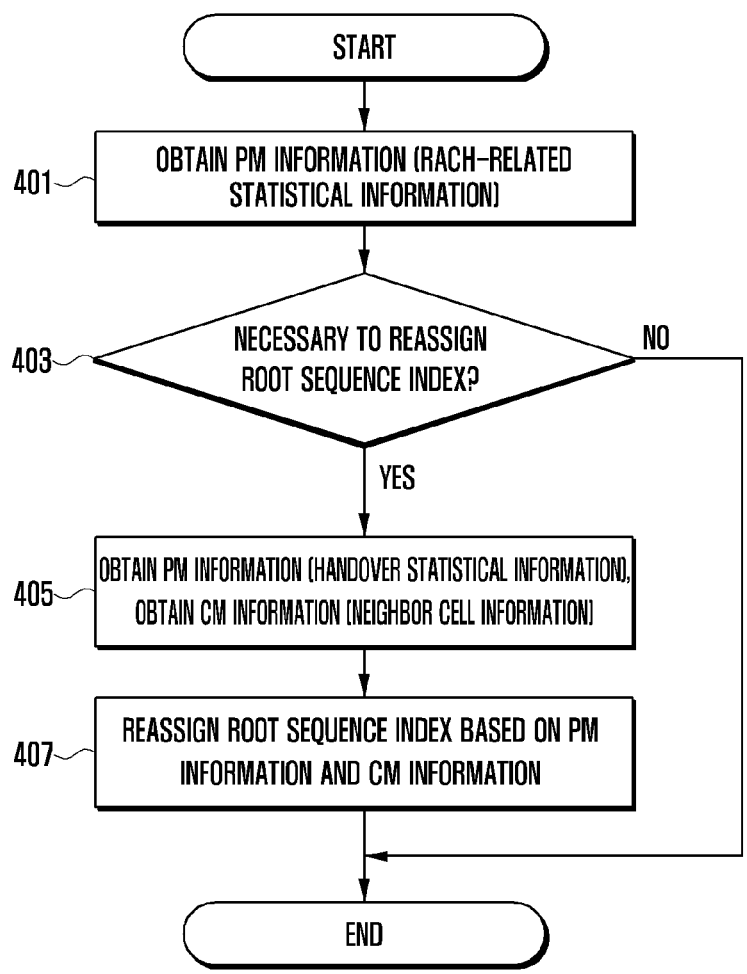
FIG. 4 is a flowchart of a procedure for a network management server to reassign the root sequence index according to an embodiment of the disclosure.

FIG. 4 is a flowchart of a procedure for a network management server to reassign the root sequence index.

At step 401, the network management server may obtain RACH-related statistical information included in the PM information.

At step 403, the network management server may determine whether reassignment of the root sequence index is necessary for a specific cell managed by the base station based on the RACH-related statistical information.

Upon determining that reassignment of the root sequence index is necessary, at step 405, the network management server may obtain handover related statistical information from the PM information and obtain information on the neighbor cells from the CM information. For example, the neighbor cell information may include information regarding the position of a neighbor cell (e.g., the position of an antenna covering the neighbor cell) or the root sequence index used in the neighbor cell.

At step 407, the network management server may determine a root sequence index to be reassigned to the specific cell based on the obtained PM information and the CM information, and reassign the determined root sequence index to the specific cell.

To determine necessity of reassignment of the root sequence index, RACH-related counter information obtained from the performance management counters (PM counters) may be used as RACH-related statistical information.

The network management server can use the RACH-related counter information to determine whether to reassign the root sequence index based on the number of transmissions of the RA preamble signal transmitted by the terminal to the base station. The network management server can use the counter information to determine whether to reassign the root sequence index based on the ratio between the number of RA preamble signal transmissions and the number of scheduled transmission messages transmitted by the terminal to the base station.

For example, the network management server can identify the number of RA message 1's transmitted to the base station in a contention-based situation where multiple terminals can use the same resources in the cell. The network management server can also identify the number of RA message 3's transmitted to the base station in the contention-based situation.

As another example, the network management server can identify the number of RA message 1's transmitted to the base station in a contention-free situation where multiple terminals can use their dedicated resources in the cell. The network management server can also identify the number of RA message 3's transmitted to the base station in the contention-free situation.

Next, the network management server can determine whether to reassign the root sequence index by applying the obtained RACH-related counter information to Condition 1, Condition 2, and Condition 3 below.

The network management server can determine whether to reassign the root sequence index by combining Condition 1, Condition 2, and Condition 3 according to various logical operations (e.g., AND, OR, etc.).

For example, the reassignment of the root sequence may be determined when all of Condition 1, Condition 2, and Condition 3 are satisfied. The reassignment of the root sequence may also be determined when any one of Condition 1, Condition 2, and Condition 3 is satisfied.

In Condition 1, Condition 2, and Condition 3 below, A denotes the number of detected RA message 1's in a contention-based situation, and B denotes the number of detected RA message 3's in the contention-based situation;

and C denotes the number of detected RA message 1's in a contention-free situation, and D denotes the number of detected RA message 3's in the contention-free situation.

$A > Th1 \ \& \ B/A < Th2$ [Condition 1]

$C > Th3 \ \& \ D/C < Th4$ [Condition 2]

$A+C > Th5 \ \& \ (B+D)/(A+C) < Th6$ [Condition 3]

According to Condition 1, the network management server can determine that root sequence reassignment is necessary when the value of A is larger than a threshold Th1 and the ratio of B to A is smaller than a threshold Th2.

Here, if the ratio of B to A is 1, the number of RA message 1's and the number of RA message 3's are the same, and there is no root sequence collision. If the ratio of B to A is less than 1, as the number of RA message 1's is greater than the number of RA message 3's, a root sequence collision may be expected. In this case, to determine reassignment in consideration of the overall number of message transmissions, it is possible to consider that the value of A is greater than or equal to a given threshold.

Similarly, according to Condition 2, the network management server can determine that root sequence reassignment is necessary when the value of C is greater than a threshold Th3 and the ratio of D to C is less than a threshold Th4. According to Condition 3, the network management server can determine that root sequence reassignment is necessary when the value of A+C is greater than a threshold Th5 and the ratio of B+D to A+C is less than a threshold Th6.

The thresholds Th1 to Th6 may be determined manually or automatically by the network operator or device.

If it is determined that reassignment of the root sequence index is necessary, the network management server can select the root sequence to be reassigned.

To select the root sequence index, the handover related counter information obtained from the PM counters may be used as the handover statistical information.

The network management server can determine the root sequence index to be reassigned by using the handover related counter information.

For example, the network management server can use the number of successful network-controlled handovers (NCHO) between neighbor cells as handover related counter information. The network management server can also use the number of successful UE-based handovers between neighbor cells as handover related counter information.

Next, the network management server can determine the root sequence index by applying the obtained handover related counter information to Equation 2 below.

First, the network management server can extract a root sequence index pool.

The root sequence index pool may be obtained by excluding the root sequence indexes already used from co-site cells using the common antennas of the list of available root sequence indexes (RSI whitelist). Alternatively, the root sequence index pool may be configured to include the already used root sequence indexes.

The network management server can select a root sequence index satisfying Equation 2 below from the root sequence index pool.

$$U_m = \mathrm{argmin} \sum_{i \in NR} (X_{m,i} + Y_{m,i} + X_{i,m} + Y_{i,m}) \delta_{u_m, u_i} \quad \text{Equation 2}$$

NR: set of neighbor cells w/equal 5G-ARFCN
$X_{m,j}$, $Y_{m,j}$: # of HO from $m^{th}$ cell to $i^{th}$ cell
$\delta u_m, u_i =$, 1 if ($u_m = u_j$)
$u_j$: RSI of $i^{th}$ cell In Equation 2, NR may denote a set of neighbor cells in the same carrier frequency band.

argmin is to find the root sequence index of a neighbor cell having the minimum number of handovers among the neighbor cells in relation to the cell requiring root sequence index reassignment.

$X_{m,j}$ may indicate the number of successful network-controlled handovers from the $m^{th}$ cell to the $i^{th}$ cell.

$Y_{m,j}$ may indicate the number of successful UE-based handovers from the $m^{th}$ cell to the cell.

$\delta u_m$, $u_i$ may have a value of 0 if the root sequence index of the $m^{th}$ cell is different from the root sequence index of the $i^{th}$ cell, and may have a value of 1 if the root sequence index of the $m^{th}$ cell is the same as the root sequence index of the $i^{th}$ cell. Hence, the number of handovers between neighbor cells having the same root sequence index can be added to each other.

In addition, $u_i$ may indicate the root sequence index of the $i^{th}$ cell.

Figure 5:
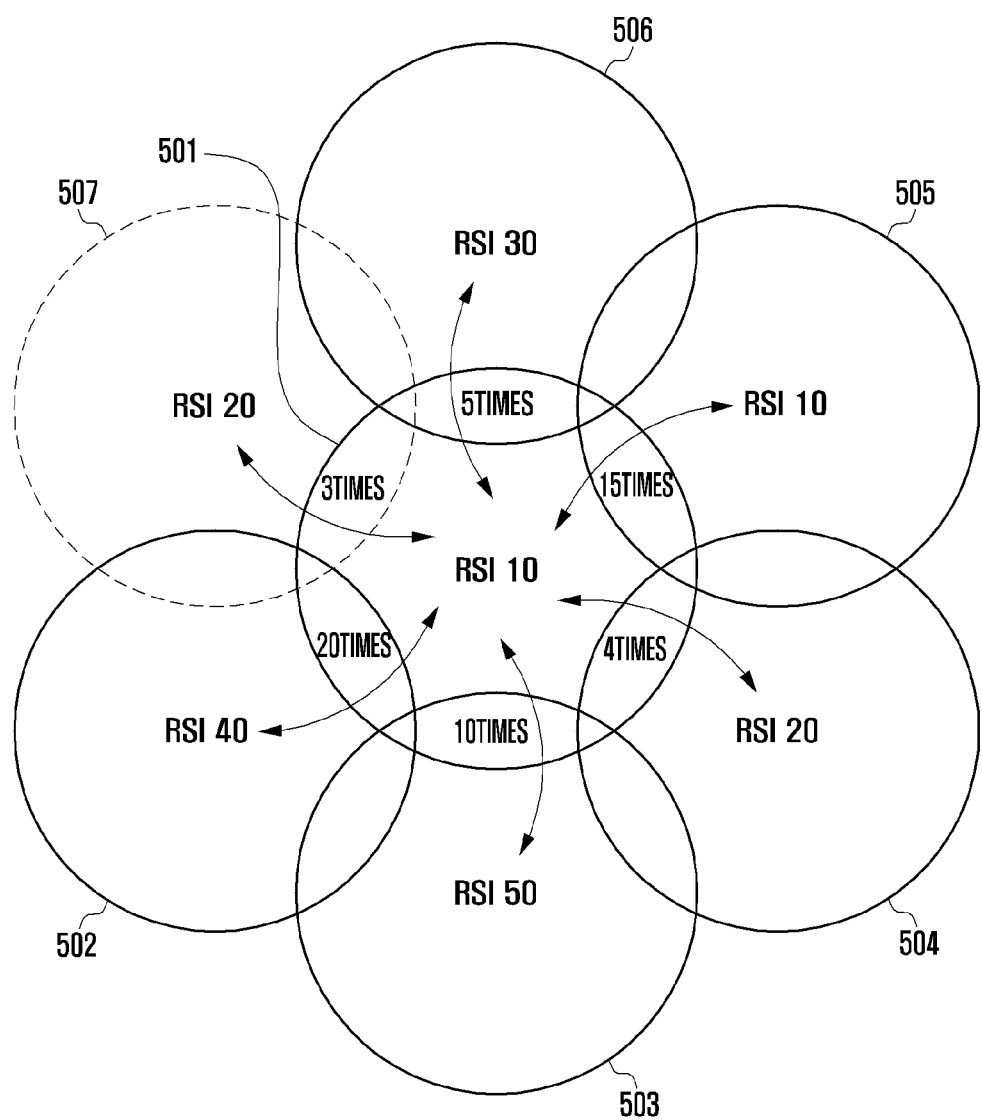
FIG. 5 depicts a process of determining the root sequence index according to an embodiment of the disclosure.

FIG. 5 depicts a conceptual process of determining the root sequence index based on Equation 2.

As shown in FIG. 5, in a network environment where a plurality of cells exist, a root sequence index may be assigned to each of the cells.

For example, as a root sequence index, a value of 10 is assigned to the first cell 501, a value of 40 is assigned to the second cell 502, a value of 50 is assigned to the third cell 503, a value of 20 is assigned to the fourth cell 504, a value of 10 is assigned to the fifth cell 505, and a value of 30 is assigned to the sixth cell 506.

In this case, as the same root sequence index is assigned to the first cell 501 and the fifth cell 505, there is a high possibility that a false alarm will occur for the RA preamble signal transmitted by the terminal located in the boundary region between the first cell 501 and the fifth cell 505. Hence, there may be a need to reassign the root sequence index of 10 for the first cell 501.

To this end, according to Equation 2, the root sequence index to be assigned to the first cell 501 may be determined based on the number of handovers between cells.

For example, the number of handovers between the first cell 501 and the second cell 502 is 20, the number of handovers between the first cell 501 and the third cell 503 is 10, the number of handovers between the first cell 501 and the fourth cell 504 is 4, the number of handovers between the first cell 501 and the fifth cell 505 is 15, and the number of handovers between the first cell 501 and the sixth cell 506 is 5.

In this case, the cell having the minimum number of handovers with the first cell 501 may be the fourth cell 504 having four handovers. Hence, a root sequence index of 20, which is the root sequence index assigned to the fourth cell 504, may be assigned to the first cell 501 requiring root sequence index reassignment.

Meanwhile, some neighbor cells of the first cells 501 may use the same root sequence index. For example, assuming that the fourth cell 504 and the seventh cell 507 have the same root sequence index of 20, the sum of the number of handovers between the first cell 501 and the fourth cell 504 and the number of handovers between the first cell 501 and the seventh cell 507 will be seven (7). Here, the sum of the number of handovers of the cells using the same root sequence index of 20 may become greater than the number of handovers of a cell using a different root sequence index.

Then, the network management server may sum the number of handovers of the fourth cell 504 and the seventh cell 507 having the same root sequence index, and may select the sixth cell 506 having the minimum number of handovers of 5 from among the neighbor cells whose number of handovers are summed or having a different root sequence index.

As a result, a root sequence index of 30, which is the root sequence index assigned to the sixth cell 506, may be assigned to the first cell 501 requiring root sequence index reassignment.

Figure 6:
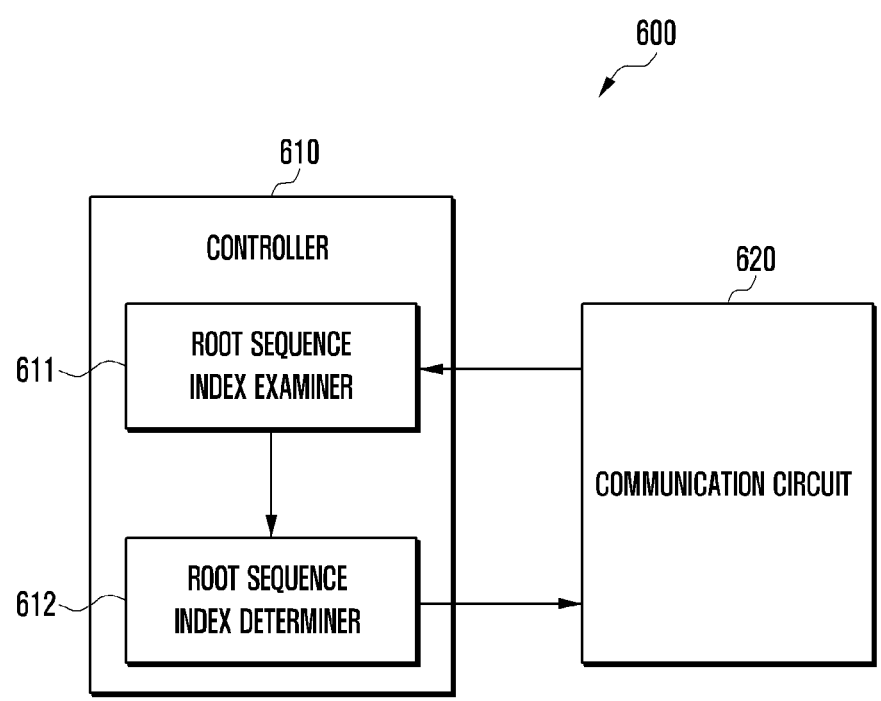
FIG. 6 is a block diagram of a network management server according to an embodiment of the disclosure.

FIG. 6 is a block diagram of the network management server according to an embodiment of the disclosure.

The network management server 600 may include a controller 610 and a communication circuit 620.

The controller 610 (or, processor) controls overall operations of the terminal. For example, the controller 610 transmits and receives signals through the communication circuit 620. The controller 610 may also write data or read data to or from a storage (not shown).

The controller 610 may include at least one processor. The controller 610 may include a communication processor (CP) to control communication, and an application processor (AP) to control higher layers such as an application program.

The communication circuit 620 can receive various signals, messages, and data from other entities under the control of the controller 610. The communication circuit 620 can also transmit a signal processed by the controller 610 to another entity.

The communication circuit 620 may perform functions for receiving signals via a wireless or wired channel. The communication circuit 620 may include a transceiver to transmit and receive signals. For example, the communication circuit 620 may perform functions such as receiving a radio frequency (RF) signal, frequency conversion, demodulation, decoding, cyclic prefix (CP) removal, fast Fourier transform (FFT), channel estimation, and equalization. The communication circuit 620 may include at least one of a cellular module, a WiFi module, a Bluetooth module, a GNSS module, an NFC module, or an RF module, for example. In one embodiment, some (e.g., two or more) of the cellular module, the WiFi module, the Bluetooth module, the GNSS module, and the NFC module may be included in one integrated chip (IC) or IC package.

The controller 601 may include a root sequence index examiner 611 to check whether to reassign the root sequence index, and a root sequence index determiner 612 to determine a root sequence index.

In various embodiments, the root sequence index examiner 611 can determine whether to reassign the root sequence index of a cell managed by the base station based on the information obtained through the communication circuit 620.

In one embodiment, the root sequence index examiner 611 can determine whether to reassign the root sequence index based on the RACH-related statistical information related to the random access procedure between the terminal and the base station managing the cell in which the terminal is located. Here, the RACH-related statistical information may include information about at least one of the number of RA preamble signals transmitted by the terminal to the base station or the number of scheduled transmission messages transmitted by the terminal to the base station.

In another embodiment, the root sequence index examiner 611 can determine whether to reassign the root sequence index based on the ratio between the number of transmitted RA preamble signals and the number of transmitted scheduled transmission messages.

Upon receiving a request signal for root sequence index reassignment from the root sequence index examiner 611, the root sequence index determiner 612 may determine the root sequence index to be reassigned to the cell based on the handover between the cell and neighbor cells thereof.

In one embodiment, the root sequence index determiner 612 can determine the root sequence index of the neighbor cell having the smallest number of handovers with the cell as the root sequence index to be reassigned to the cell. Here, the number of handovers may include at least one of the number of successful network-controlled handovers between the cell requiring root sequence index reassignment and neighbor cells, or the number of successful UE-based handovers between the cell and neighbor cells.

In another embodiment, the root sequence index determiner 612 may sum the number of handovers of the neighbor cells having the same root sequence index, and may determine the root sequence index to be reassigned to the cell based on the number of handovers of the neighbor cells whose number of handovers are summed or having a different root sequence index.

In another embodiment, the root sequence index determiner 612 may determine the root sequence index to be reassigned to the cell from among root sequence indexes belonging to the root sequence index pool.

The communication circuit 620 can transmit the root sequence index determined by the root sequence index determiner 612 to the base station managing the cell requiring root sequence index reassignment. The base station may broadcast the received root sequence index to terminals in the cell requiring reassignment.

Figure 7:
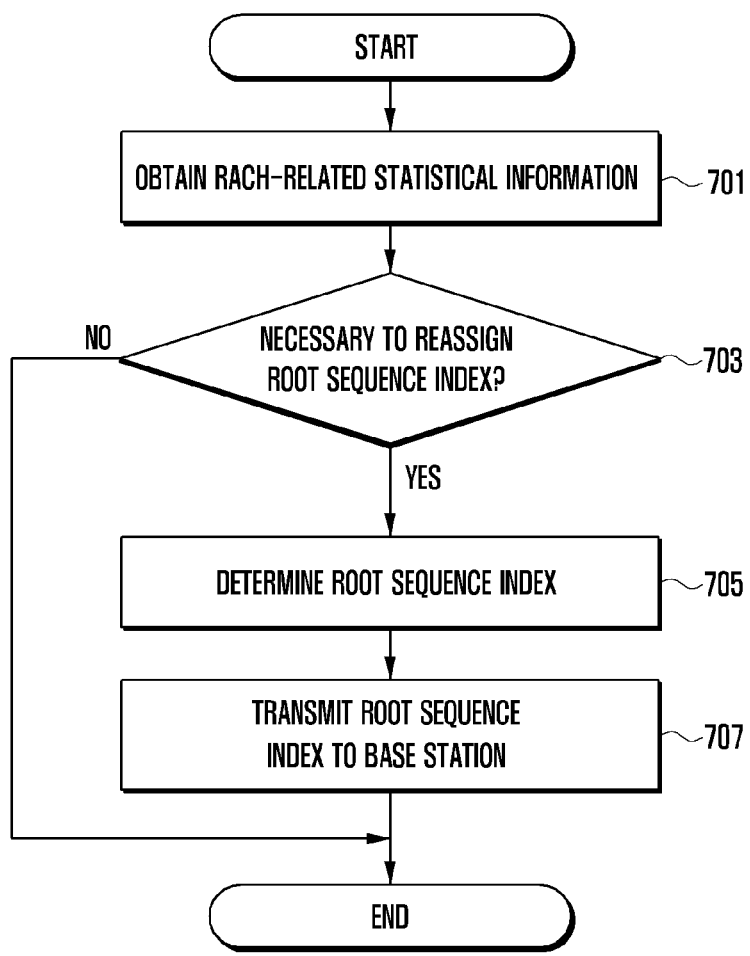
FIG. 7 is a flowchart of a procedure for the network management server to reassign the root sequence index according to an embodiment of the disclosure.

FIG. 7 is a flowchart of a procedure for the network management server to reassign the root sequence index according to an embodiment of the disclosure.

At step 701, the network management server can obtain RACH-related statistical information in relation to the random access procedure between the terminal and the base station.

At step 703, the network management server can determine whether it is necessary to reassign the root sequence index of a specific cell managed by the base station based on the received RACH-related statistical information.

In one embodiment, the network management server can determine whether to reassign the root sequence index based on the RACH-related statistical information related to the random access procedure between the terminal located in the cell and the base station. Here, the RACH-related statistical information may include information about at least one of the number of RA preamble signals transmitted by the terminal to the base station or the number of scheduled transmission messages transmitted by the terminal to the base station.

In another embodiment, the network management server can determine whether to reassign the root sequence index based on the ratio between the number of transmitted RA preamble signals and the number of transmitted scheduled transmission messages.

If it is necessary to reassign the root sequence index, at step 705, the network management server may determine the root sequence index to be reassigned to the cell based on the number of handovers between the cell and neighbor cells thereof.

In one embodiment, the network management server can determine the root sequence index of the neighbor cell having the smallest number of handovers with the cell as the root sequence index to be reassigned to the cell. Here, the number of handovers may include at least one of the number of successful network-controlled handovers between the cell requiring root sequence index reassignment and neighbor cells, or the number of successful UE-based handovers between the cell and neighbor cells.

In another embodiment, the network management server may sum the number of handovers of the neighbor cells having the same root sequence index, and may determine the root sequence index to be reassigned to the cell based on the number of handovers of the neighbor cells whose number of handovers are summed or having a different root sequence index.

In another embodiment, the network management server may determine the root sequence index to be reassigned to the cell from among root sequence indexes belonging to the root sequence index pool.

Next, at step 707, the network management server can transmit the determined root sequence index to the base station managing the cell requiring root sequence index reassignment. The base station may broadcast the received root sequence index to terminals in the cell requiring reassignment.

The embodiments of the disclosure may be implemented in a software program that includes instructions stored in a computer-readable storage medium. The software program may include at least a portion of the data to be executed by the instructions.

A computer is an equipment capable of invoking a software program from a storage medium and performing operations based on the invoked instructions according to the disclosed embodiment, and may include a network management apparatus according to the disclosed embodiments.

The software program may correspond to the steps, operations, or functions of the disclosed embodiments. The software program may include at least one of a machine code, a high-level language code, an application (or app) program, an application programming interface, a driver, a firmware, or a patch program.

The computer-readable storage medium may be provided in the form of a non-transitory storage medium. The non-transitory media may include media such as CD, DVD, hard disk, Blu-ray disk, USB, memory card, or ROM, which semi-permanently stores data and is readable by a processor, and may include a volatile or non-volatile memory that temporarily stores data for operation or transmission, such as a register, cache, buffer, or RAM.

The invention claimed is:

1. A method for a network management server to determine a root sequence index, the method comprising:
    determining whether to reassign a root sequence index of a cell managed by a base station based on a random access channel (RACH)-related statistical information including a ratio between a number of random access (RA) preamble signals transmitted by at least one terminal to the base station and a number of scheduled transmission messages transmitted by the at least one terminal to the base station;
    determining a root sequence index to be reassigned to the cell based on a number of handovers between the cell and neighbor cells thereof, in case that the root sequence index is determined to be reassigned; and
    transmitting the determined root sequence index to the base station.

2. The method of claim 1, wherein the RACH-related statistical information comprises information associated with at least one of the number of RA preamble signals transmitted by the at least one terminal to the base station or the number of scheduled transmission messages transmitted by the at least one terminal to the base station.

3. The method of claim 1, wherein determining the root sequence index to be reassigned to the cell comprises determining a root sequence index of a neighbor cell having a smallest number of handovers with the cell as the root sequence index to be reassigned to the cell.

4. The method of claim 1, wherein determining the root sequence index to be reassigned to the cell comprises:
    summing the number of handovers of the neighbor cells having a same root sequence index; and
    determining the root sequence index to be reassigned to the cell based on the number of handovers of the neighbor cells whose number of handovers is summed or having a different root sequence index.

5. The method of claim 1, wherein determining the root sequence index to be reassigned to the cell comprises determining the root sequence index to be reassigned to the cell from among root sequence indexes belonging to a root sequence index pool.

6. The method of claim 1, wherein the number of handovers includes at least one of a number of successful network-controlled handovers between the cell and neighbor cells, or a number of successful terminal-based handovers between the cell and neighbor cells.

7. The method of claim 1, wherein the base station broadcasts the determined root sequence index to terminals located in the cell.

8. The method of claim 1, wherein the network management server includes a self-optimized network (SON) server.

9. A network management server capable of determining a root sequence index, comprising:
    a controller configured to:
        determine whether to reassign a root sequence index of a cell managed by a base station based on a random access channel (RACH)-related statistical information including a ratio between a number of random access (RA) preamble signals transmitted by at least one terminal to the base station and a number of scheduled transmission messages transmitted by the at least one terminal to the base station, and
        determine a root sequence index to be reassigned to the cell based on a number of handovers between the cell and neighbor cells thereof, in case that the root sequence index is determined to be reassigned; and
    a communication circuit configured to transmit the determined root sequence index to the base station.

10. The network management server of claim 9, wherein the RACH-related statistical information comprises information associated with at least one of the number of RA preamble signals transmitted by the at least one terminal to the base station or the number of scheduled transmission messages transmitted by the at least one terminal to the base station.

11. The network management server of claim 10, wherein the controller is configured to determine whether to reassign a root sequence index based on random access channel (RACH)-related statistical information associated with a random access procedure between a terminal located in the cell and the base station.

12. The network management server of claim 9, wherein the controller is configured to determine the root sequence index of a neighbor cell having a smallest number of handovers with the cell as the root sequence index to be reassigned to the cell.

13. The network management server of claim 9, wherein the controller is configured to:
   sum the number of handovers of the neighbor cells having a same root sequence index, and
   determine the root sequence index to be reassigned to the cell based on the number of handovers of the neighbor cells whose number of handovers is summed or having a different root sequence index.

14. The network management server of claim 9, wherein the controller is configured to determine the root sequence index to be reassigned to the cell from among root sequence indexes belonging to a root sequence index pool.

15. The network management server of claim 9, wherein the number of handovers includes at least one of a number of successful network-controlled handovers between the cell and neighbor cells, or a number of successful terminal-based handovers between the cell and neighbor cells.

* * * * *